C. A. NOAKES.
HORSE WHIPPING DEVICE.
APPLICATION FILED APR. 16, 1915.
1,158,264.
Patented Oct. 26, 1915.
2 SHEETS—SHEET 1.
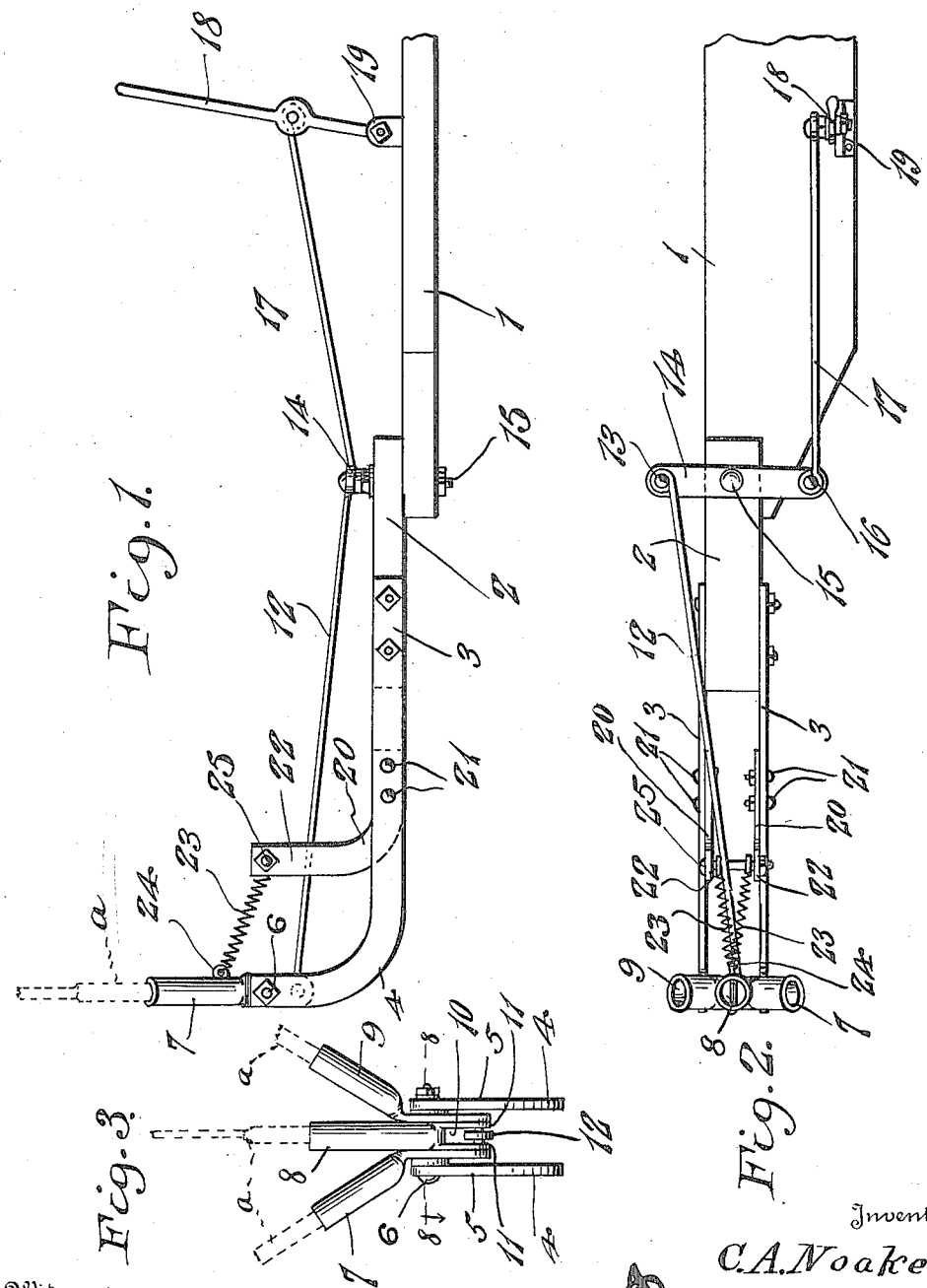

C. A. NOAKES.
HORSE WHIPPING DEVICE.
APPLICATION FILED APR. 16, 1915.
1,158,264.
Patented Oct. 26, 1915.
2 SHEETS—SHEET 2.
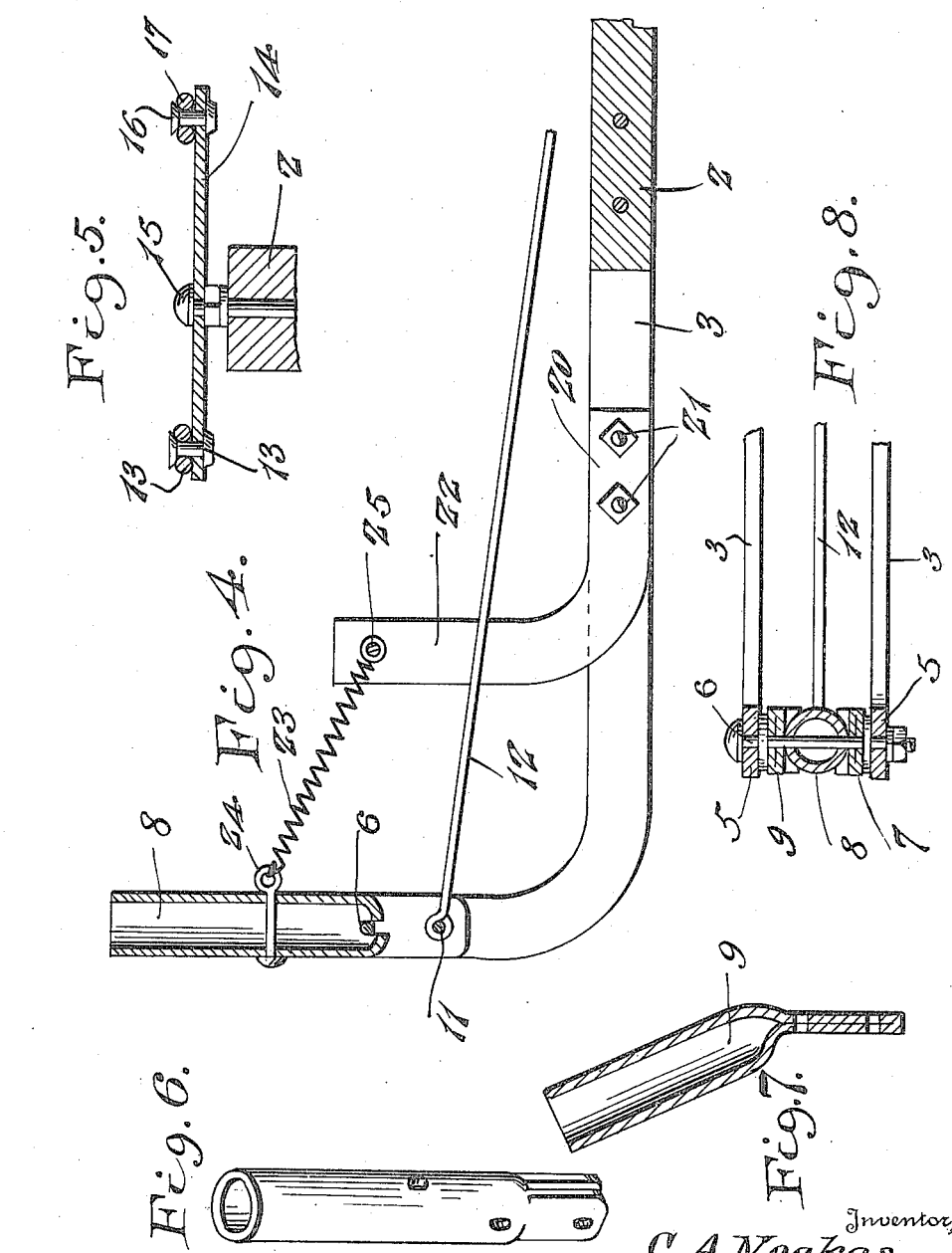

UNITED STATES PATENT OFFICE.

CHARLES A. NOAKES, OF ROCK LAKE, NORTH DAKOTA.

HORSE-WHIPPING DEVICE.

1,158,264.  Specification of Letters Patent.  Patented Oct. 26, 1915.

Application filed April 16, 1915. Serial No. 21,717.

*To all whom it may concern:*

Be it known that I, CHARLES A. NOAKES, a citizen of the United States, residing at Rock Lake, in the county of Towner and State of North Dakota, have invented certain new and useful Improvements in Horse-Whipping Devices; and I do hereby declare the following to be a full, clear, and exact description of the invention, such as will enable others skilled in the art to which it appertains to make and use the same.

This invention relates to horse whipping devices, designed for the purpose of controlling horses used as draft-animals for triple gang plows and other large agricultural implements requiring seven or more horses or draft-animals, and one of the principal objects of the invention is to provide a device to be operated by a hand lever within reach of the driver for applying a plurality of whips to a number of the leading horses or draft-animals without frightening the other horses in the team.

Another object of the invention is to provide a device of simple construction to be attached to the front end of the tongue of a gang plow and providing a number of spring actuated whips mounted in sockets, and a rod leading from the lower end of the socket back to a hand lever to be operated by the driver for applying the whip to the leading animals.

The foregoing and other objects may be attained by means of the construction illustrated in the accompanying drawings, in which—

Figure 1 is a side elevation of a horse whipping device made in accordance with this invention, the whips being shown broken away at their outer ends, Fig. 2 is a top plan view of the same, Fig. 3 is a front end view of the whipping device, Fig. 4 is a vertical section of one of the whip sockets, showing the manner of pivoting the whip sockets and showing the connecting rod leading back and broken away, Fig. 5 is a sectional view of the double lever pivoted to the rear end of the tongue, Fig. 6 is a perspective view of the central whip socket, Fig. 7 is a vertical sectional view of one of the side whip sockets, and Fig. 8 is a detail sectional view taken on the line 8—8 of Fig. 3 looking in the direction indicated by the arrow.

Referring to the drawings, the numeral 1 designates the front end of a gang plow or other agricultural implement, and connected to said implement is a tongue 2. Connected to the opposite sides of the tongue at 2 are the frame bars 3 of the whipping device, said bars having their front ends curved as at 4 and provided with vertical members 5. Pivotally mounted on a bolt 6 between the members 5 are three whip sockets 7 and 8 and 9. The whip sockets 7 and 9 are preferably made of gas piping or tubes of the required size having their lower ends flattened and the upper ends bent to diverge, as shown more clearly in Fig. 3. The central whip socket 8 is provided with a recess 10 in its lower end, and a bolt or pin 11 extends across the recess and connects the flattened portions of the whip sockets 7 and 9 thereto. Whips *a* are mounted in the sockets 7, 8, and 9.

A connecting rod 12 is connected to the pin 11 and extends backward and is pivoted at 13 to a lever 14, said lever being pivoted upon a bolt 15 which extends through the tongue and through the front end of the implement. Pivotally connected to the opposite end of the lever 14 at 16 is a rod 17 which extends back to a lever 18, mounted in a bracket 19 on top of the frame within reach of the driver.

Connected to the frame bars 3 on the inner side thereof are supporting members 8 connected to the bars 3 by suitable bolts 21, and having vertical members 22. Connected to the members 22 are springs 23, and the opposite ends of said springs are connected to a staple 24 on the central whip socket 8. The springs 23 are connected to the vertical members 22 by means of a bolt 25.

From the foregoing it will be obvious that a driver by pushing the lever 18 forward will apply the three whips *a* to the leading horses of the team, and that the springs 23 will return the whips to a vertical position after each operation.

Various changes may be made in the details of construction without departing from the spirit and scope of the invention as defined in the claim.

What is claimed is:—

A whipping device for draft-animals comprising a frame connected to the front end of the tongue of a gang implement, said frame comprising parallel bars having vertical members, whip sockets pivoted to the vertical members, two of said whip sockets being arranged to diverge from the upper ends of the members, said whip sockets being connected together at their lower ends, a connecting rod attached to one of said whip sockets, a lever mounted on the tongue at the rear thereof to which said connecting rod is pivoted, an operating rod connected to the lever, and an operating lever for applying the whips to the leading horses, and springs for returning the whips to a vertical position.

In testimony whereof I affix my signature in presence of two witnesses.

CHARLES A. NOAKES.

Witnesses:
ANDREW FOLEY,
W. C. LINDSAY.

Copies of this patent may be obtained for five cents each, by addressing the "Commissioner of Patents, Washington, D. C."